US011154048B2

(12) United States Patent
Power, II et al.

(10) Patent No.: US 11,154,048 B2
(45) Date of Patent: *Oct. 26, 2021

(54) TREE STAND PLATFORM ASSEMBLY

(71) Applicant: Tethrd LLC, Carver, MN (US)

(72) Inventors: Walter Ernest Power, II, Carver, MN (US); Gregory Alan Godfrey, Richmond Hill, GA (US); Garrett Robert Prahl, Brooklyn Park, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/178,319

(22) Filed: Feb. 18, 2021

(65) Prior Publication Data
US 2021/0169067 A1 Jun. 10, 2021

Related U.S. Application Data

(63) Continuation-in-part of application No. 17/022,756, filed on Sep. 16, 2020, now abandoned, which is a continuation of application No. 16/364,979, filed on Mar. 26, 2019, now abandoned, which is a continuation of application No. 16/375,378, filed on Apr. 4, 2019, now Pat. No. 10,791,729.

(51) Int. Cl.
*A01M 31/02* (2006.01)
*F16B 2/00* (2006.01)
*F16M 13/02* (2006.01)
*F16B 2/08* (2006.01)

(52) U.S. Cl.
CPC .............. *A01M 31/02* (2013.01); *F16B 2/005* (2013.01); *F16B 2/08* (2013.01); *F16M 13/022* (2013.01)

(58) Field of Classification Search
CPC .......... A01M 31/02; F16B 2/005; F16B 2/08; F16M 13/022
USPC ............... 248/309.1, 156; 182/113, 116, 187
See application file for complete search history.

(56) References Cited

U.S. PATENT DOCUMENTS

| | | | |
|---|---|---|---|
| 4,936,416 A | 6/1990 | Garon | |
| 5,060,756 A * | 10/1991 | D'Acquisto | A01M 31/025 182/187 |
| 5,143,177 A | 9/1992 | Smith | |
| 5,439,074 A * | 8/1995 | Trout | A01M 31/02 108/152 |
| 5,740,882 A * | 4/1998 | Griffith | A01M 31/02 182/116 |
| 6,029,772 A | 2/2000 | Takahashi | |
| 6,397,973 B1 * | 6/2002 | Woller | A01M 31/02 182/135 |
| 6,811,180 B1 * | 11/2004 | Molliere | A01M 31/006 182/116 |
| 7,802,654 B2 * | 9/2010 | Tolliver | A01M 31/02 182/136 |
| 8,230,972 B2 * | 7/2012 | Johnson | A01M 31/02 182/187 |

(Continued)

*Primary Examiner* — Muhammad Ijaz

(57) ABSTRACT

A tree stand platform assembly includes a platform that has a perimeter edge with a front edge, a rear edge, a first lateral edge and a second lateral edge. The platform has a top surface, a bottom surface and an outer surface positioned between the top and bottom surfaces. The front edge is configured to engage a tree. A plurality of gripping protuberances is attached to and extends outwardly from the outer surface of the rear edge. The gripping protuberances are engageable by a user for stability when the user rotates relative to the platform.

20 Claims, 6 Drawing Sheets

(56) References Cited

U.S. PATENT DOCUMENTS

| | | | | |
|---|---|---|---|---|
| 8,991,555 B2* | 3/2015 | Furseth | ............... | A01M 31/02 |
| | | | | 182/187 |
| 8,997,933 B2* | 4/2015 | Furseth | ............... | B22D 17/22 |
| | | | | 182/222 |
| 9,027,709 B2* | 5/2015 | Wheelington | ......... | A01M 31/02 |
| | | | | 182/129 |
| 10,015,957 B1* | 7/2018 | Fast | ............... | A01M 31/02 |
| 10,791,729 B1* | 10/2020 | Power, II | ............ | A01M 31/02 |
| 2003/0127286 A1* | 7/2003 | Engstrom | ............ | A01M 31/02 |
| | | | | 182/136 |
| 2004/0074698 A1 | 4/2004 | Lawrence | | |
| 2011/0132686 A1* | 6/2011 | Priest | ............... | A01M 31/02 |
| | | | | 182/187 |
| 2012/0199418 A1* | 8/2012 | Priest | ............... | A01M 31/02 |
| | | | | 182/129 |
| 2014/0131137 A1* | 5/2014 | Bassett | ............... | A01M 31/02 |
| | | | | 182/116 |
| 2014/0166400 A1* | 6/2014 | Berkbuegler | ......... | A01M 31/02 |
| | | | | 182/129 |
| 2014/0190767 A1* | 7/2014 | Wheelington | ......... | A01M 31/02 |
| | | | | 182/129 |
| 2014/0263516 A1* | 9/2014 | Habberstad, Jr. | ..... | A01M 31/02 |
| | | | | 224/576 |
| 2014/0311828 A1* | 10/2014 | Bassett | ............... | A01M 31/02 |
| | | | | 182/124 |
| 2015/0053503 A1* | 2/2015 | Richey | ............... | A01M 31/02 |
| | | | | 182/187 |
| 2017/0245490 A1* | 8/2017 | Habberstad, Jr. | ..... | A01M 31/02 |
| 2017/0265454 A1* | 9/2017 | Kramer | ............... | A01M 31/02 |
| 2019/0053483 A1* | 2/2019 | Infalt | ............... | B23P 13/02 |
| 2019/0055782 A1 | 2/2019 | Infalt | | |
| 2021/0169067 A1* | 6/2021 | Power, II | ............ | A01M 31/02 |

\* cited by examiner

TREE STAND PLATFORM ASSEMBLY

CROSS-REFERENCE TO RELATED APPLICATIONS

This application is a continuation-in-part application and I hereby claim the benefit under 35 U.S.C. Section 120 of U.S. patent application Ser. No. 17/022,756 filed Sep. 16, 2020, which is a continuation of U.S. patent application Ser. No. 16/364,979 filed Mar. 26, 2019 and U.S. patent application Ser. No. 16/375,378 filed Apr. 4, 2019.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The invention generally relates to tree stands used for hunting purposes and more particularly those tree strands which are not permanently fixed to a tree.

(2) Description of Related Art Including Information Disclosed Under 37 CFR 1.97 and 1.98

The disclosure and prior art relates to tree stand devices and more particularly pertains to a new tree stand device for providing greater leverage and stability for a hunter while the hunter is rotating their body relative to the tree stand. The invention further includes embodiments having gripping protuberances extending outwardly from an edge of platform to enhance gripping of the platform along its perimeter edge.

BRIEF SUMMARY OF THE INVENTION

An embodiment of the disclosure meets the needs presented above by generally comprising a platform for supporting a hunter and which has a perimeter edge. The perimeter edge includes a front edge, a rear edge, a first lateral edge and a second lateral edge. The platform has a top surface, a bottom surface and an outer surface positioned between the top and bottom surfaces. The first and second lateral edges each include a front section abutting the front edge and a rear section abutting the rear edge. The rear section includes toe receiver. The toe receiver is formed by an obtuse angle formed in the outer surface of the rear section, wherein the obtuse angle is less than 160°. The toe receiver provides an engagement point for a hunter's foot as the hunter rotates laterally away from the platform.

In another embodiment, the disclosure generally includes a platform having a perimeter edge, wherein the perimeter edge includes a front edge, a rear edge, a first lateral edge and a second lateral edge. The platform has a top surface, a bottom surface and an outer surface positioned between the top and bottom surfaces. A plurality of gripping protuberances extends outwardly away from the outer surface of each of the first and second lateral edges.

In yet another embodiment, disclosed herein is a platform having a perimeter edge with a front edge, a rear edge, a first lateral edge and a second lateral edge. The platform has a top surface, a bottom surface and an outer surface positioned between the top and bottom surfaces. The front edge is configured to engage a tree. A plurality of gripping protuberances is attached to and extends outwardly from the outer surface of the rear edge. The gripping protuberances are configured to be engaged by a user for stability when the user rotates relative to the platform.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
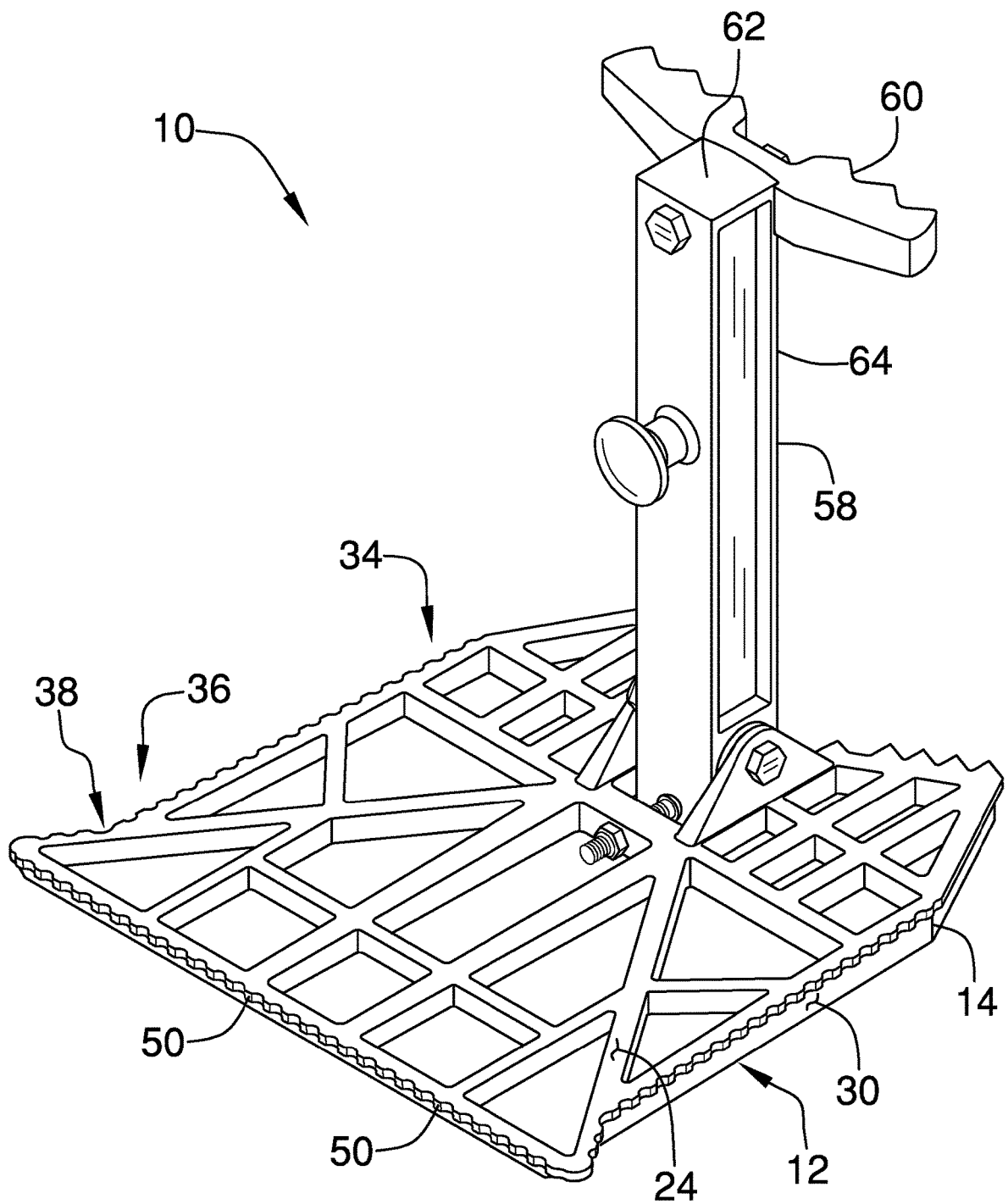
FIG. 1 is a rear isometric view of a tree stand platform assembly according to an embodiment of the disclosure.
Figure 2:
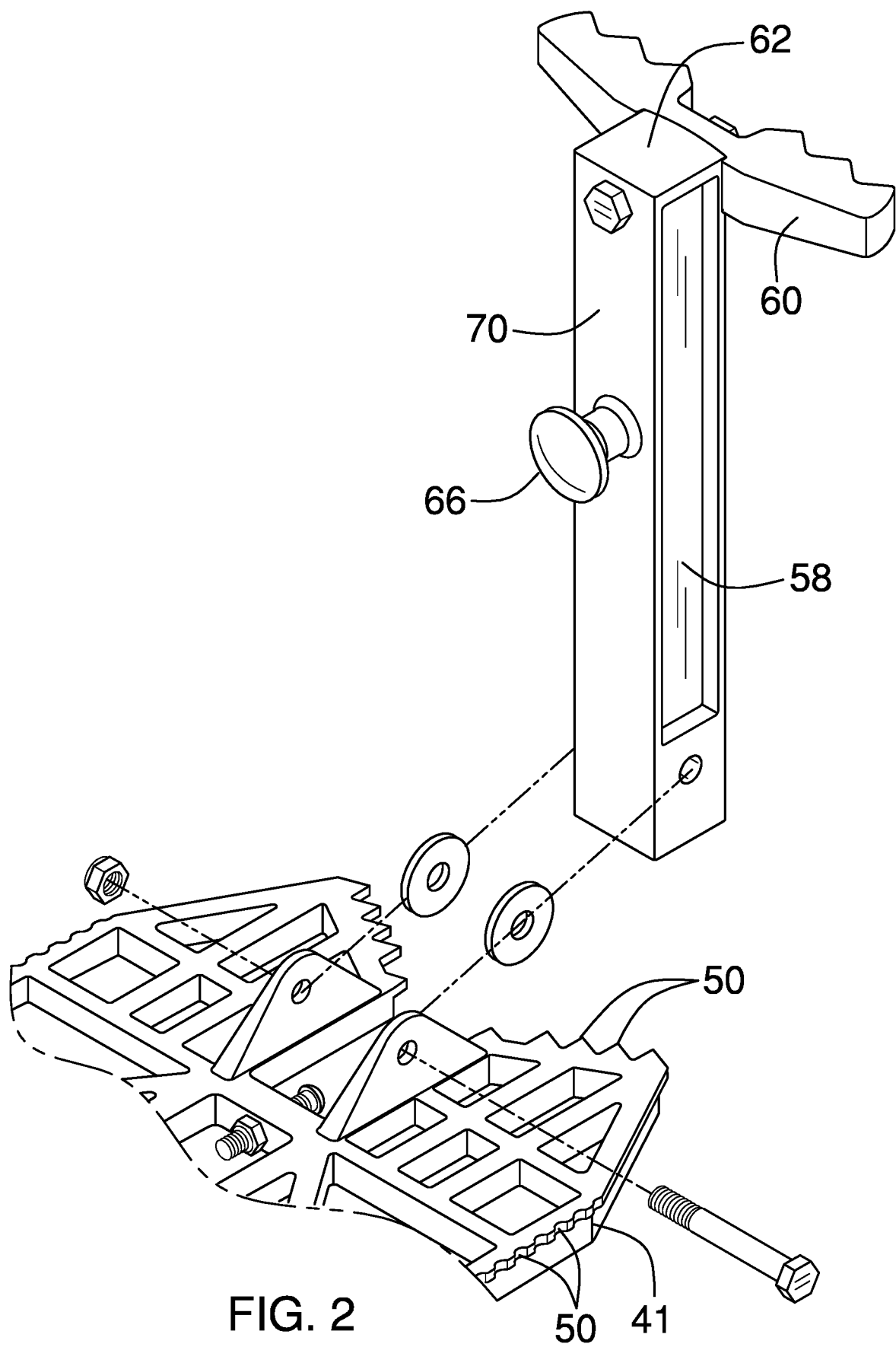
FIG. 2 is a rear exploded isometric view of an embodiment of the disclosure.

With reference now to the drawings, and in particular to FIGS. 1 through 6 thereof, a new tree stand device embodying the principles and concepts of an embodiment of the disclosure and generally designated by the reference numeral 10 will be described.

As best illustrated in FIGS. 1 through 6, the tree stand platform assembly 10 generally comprises a platform 12 that has a perimeter edge 14 which includes a front edge 18, a rear edge 16, a first lateral edge 20 and a second lateral edge 22. The platform 12 has a top surface 24, a bottom surface 26 and an outer surface 30 positioned between the top 24 and bottom 26 surfaces. As can be seen in the Figures, the interior of the platform 12 may be comprised of a framework 32 of webbing or interior supports. The particular pattern is will not affect the structure, however, by using a framework 32 instead of a solid material, the weight and costs of construction of the platform 12 are reduced while providing traction along the edges of the individual sections of the framework 32. However, it should be understood that the platform 12 could be comprised of a solid piece of material. The platform 12 may be constructed from any conventional rigid building material through metallic materials such aluminum alloys may be preferred based on weight to strength ratios as well as cost of materials. The platform 12 will typically have an overall greatest length and width each being between about 10.0 inches and 25.0 inches and typically less than 20.0 inches. The platform will have a height from the bottom surface 26 to the top surface 24 typically less than 2.0 inches. The first 20 and second 22 lateral edges, along with the front 18 and rear 16 edges form a unitary structure with each other. Also, the platform may form a continuous unitary structure starting from the front edge 18 and then extending along, in order, the first lateral edge 20, the rear edge 16 and the second lateral edge 22.

Figure 5:
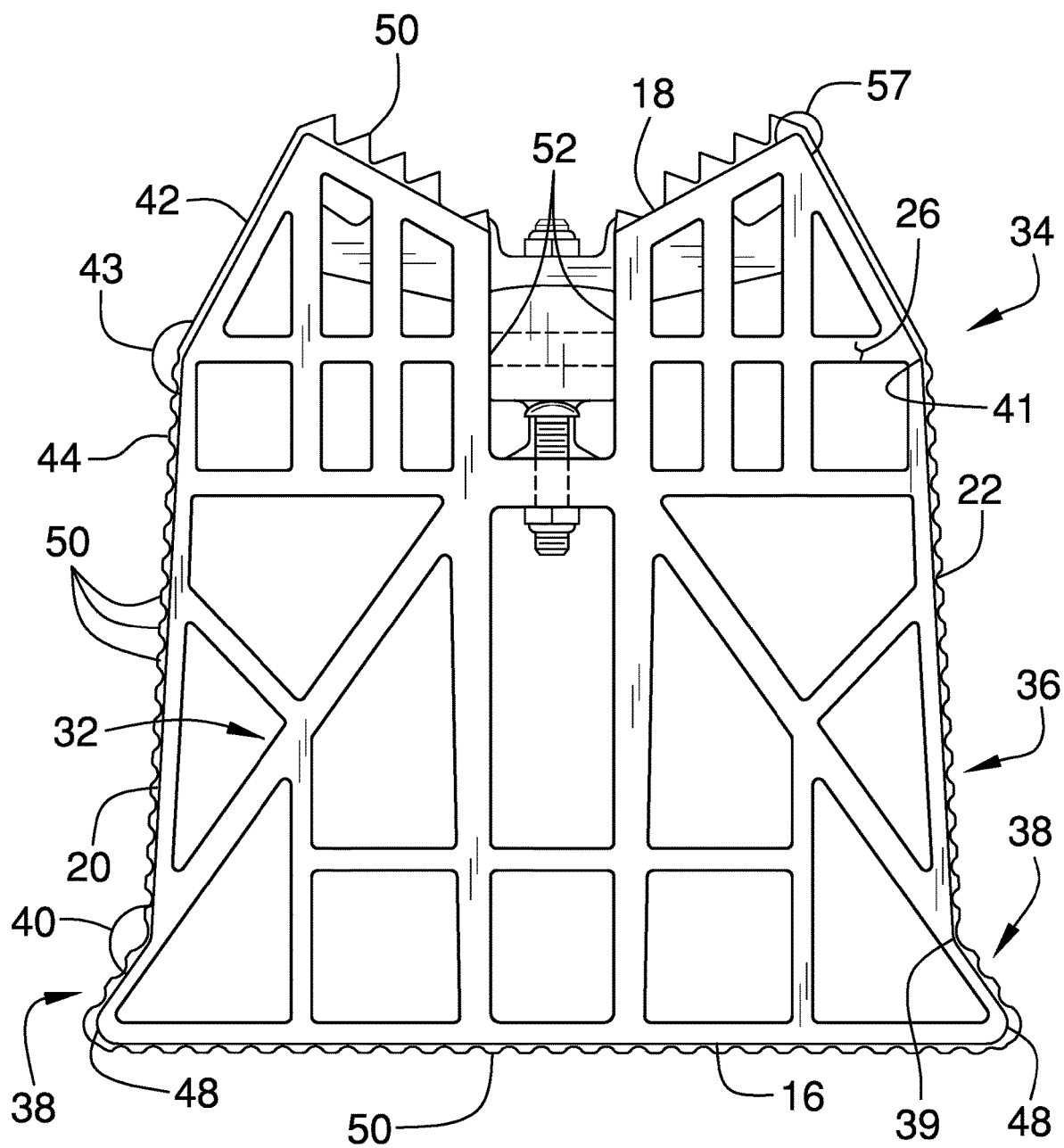
FIG. 5 is a bottom view of an embodiment of the disclosure.

The first 20 and second 22 lateral edges each include a front section 34 abutting the front edge 18 and a rear section 36 abutting the rear edge 16. The front sections 34 include at least ¼ of the first 20 and second 22 lateral sections. As can be seen best in FIG. 5, a length of the front edge 18, as measured along a line extending between the first lateral edge 20 to the second lateral edge 22, is shorter than the rear edge 16. The front section 34, as it moves from the front edge 18 and toward the rear edge 16 may be angled outwardly such that the front sections 34 taper outwardly as they travel away from the front edge 18. Alternatively, the front sections 34 may be orientated perpendicular to each other. FIG. 5 depicts the front sections 34 including a first portion 42, intersecting the front edge 18, being angled more outwardly with respect to a second portion 44, though this structure is not critical to the invention.

The rear section 36, of each of the first 20 and second 22 lateral sections includes a toe receiver 38. The toe receiver 38 is formed by a bend 39, i.e. first bend, on the outer surface 30 which forms an angle 40 in the outer surface having a measurement of less than 160°. Typically this angle 40 will measure from at least 90° and up to 160°. The toe receiver 38 will most often be positioned at the juncture of the top surface 24 and the outer surface 30. The rear section 36 includes a continuation of the second portion 44 as described above and shown in the Figures. While the second portion 44 includes the bend 39, being an outward bend, a second bend 41, being an inward bend, may be positioned between the first 42 and second 44 portions. As a concave, or inward bend, the second bend 41 will form an angle 43 on the outer surface 30 greater than 180° and typically between 190° and 250°. As can be seen in the Figures, the first bend 39 may be positioned in the rear one-third of the platform 12 while the second bend 41 may be in the front one-third of the platform 12.

The first bend 39 defines a wing 48 that acts as the toe receiver 38, or toe kick, that can be engaged by a person's foot as they attempt to position their body around a tree 46. The wings 48 can extend outwardly from a remaining portion of the first 20 and second 22 lateral edges any desired length but will typically be at least 1.0 and less than 7.0 inches, as extension beyond this length is unneeded.

Figure 3:
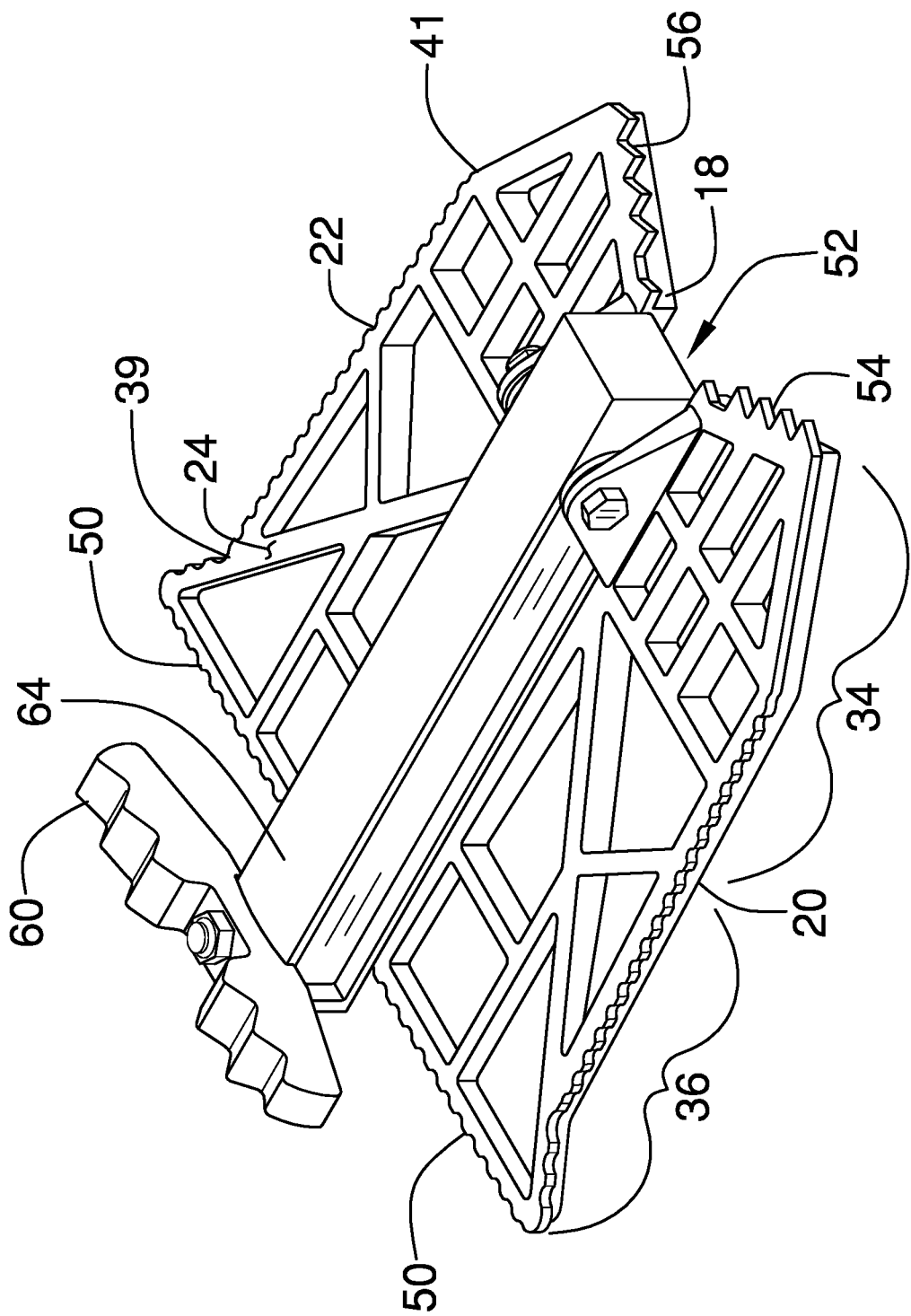
FIG. 3 is a front isometric view of an embodiment of the disclosure.
Figure 4:
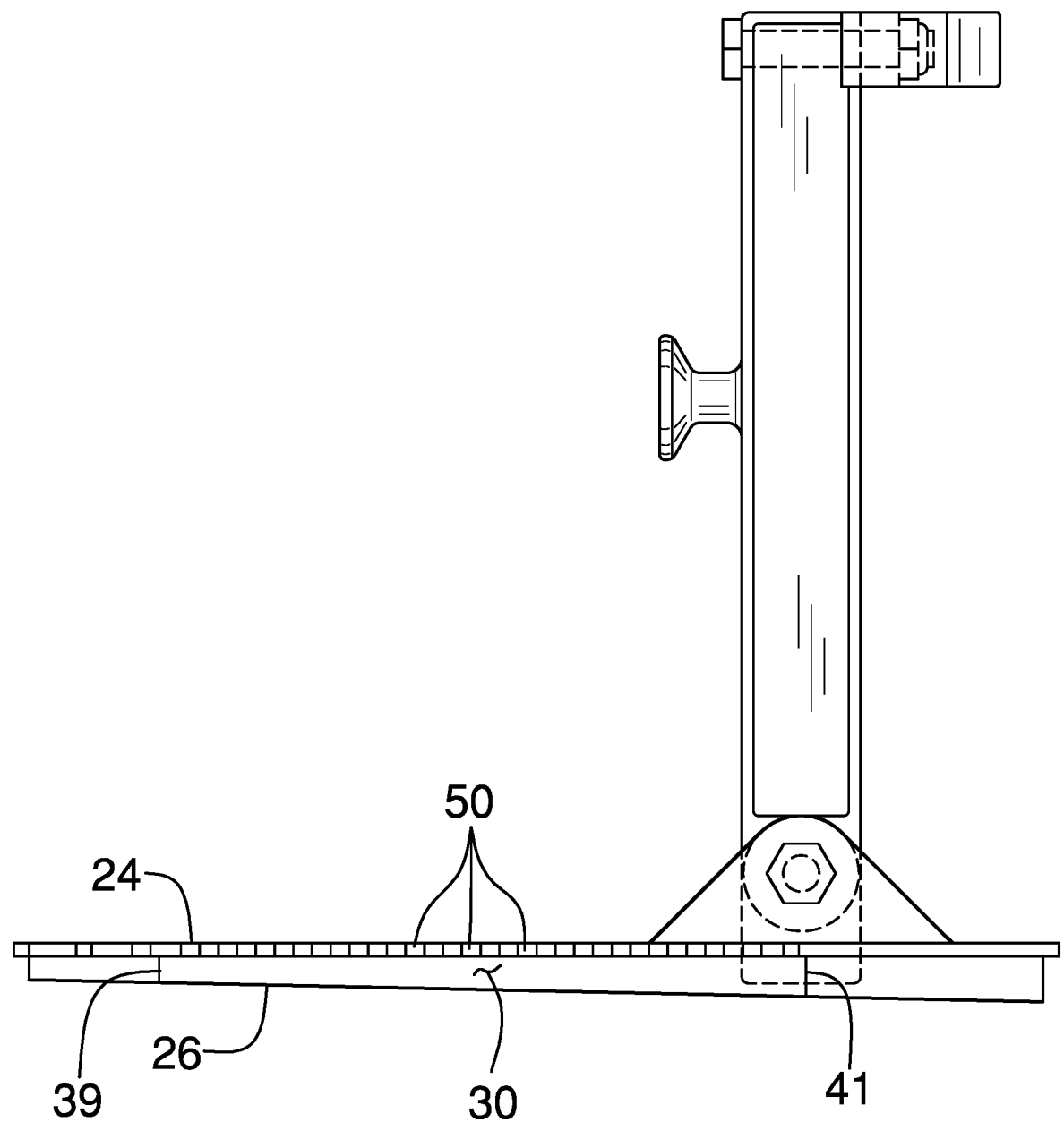
FIG. 4 is a side view of an embodiment of the disclosure.

A plurality of gripping protuberances 50 extends outwardly away from the outer surface 30 of each of the first 20 and second 22 lateral edges. The gripping protuberances 50 are positioned on each of the front 34 and rear 36 sections and in particular will also be positioned along the toe receivers 38 and on either side of the first bends 39. As can be seen in the Figures, the gripping protuberances 50 are also found along the front edge 18 to assist in frictionally engaging the surface of the tree 46. The gripping protuberances 50 will further be positioned on the rear edge 16 of the platform 12. This location prevents lateral slippage of a user's footwear when the rear edge 16 is being used as a stabilizer when the user is leaning rearwardly on the platform 12. The gripping protuberances 50 form a unitary structure with the perimeter edge 14 as can be seen in FIG. 3.

The positioning of the gripping protuberances 50 on the outer surface 30 provides gripping for a hunter as a hunter rotates their body relative to the platform 12. For example, when the hunter is using the first 20 and second 22 lateral edges to stabilize their body when pushing outwardly and laterally away from the tree 46 and the platform 12, the gripping protuberances 50 prevent the hunter's footwear from sliding along the first 20 and second lateral edges 22. To that end, the gripping protuberances 50 may be structured such that the gripping protuberances extend no higher than a plane of the top surface 24, wherein the plane may be defined as a planar surface or the combined highest points on the top surface 24 should the top surface not be planar. Alternatively, the gripping protuberances 50 may extend outwardly from the outer surface 30 as well as upwardly from the outer surface 30 such that they extend above the plane of the top surface 24. Generally, however, it is the extension laterally away from the platform 24 which provides the advantages of these additional gripping protuberances 50.

Figure 6:
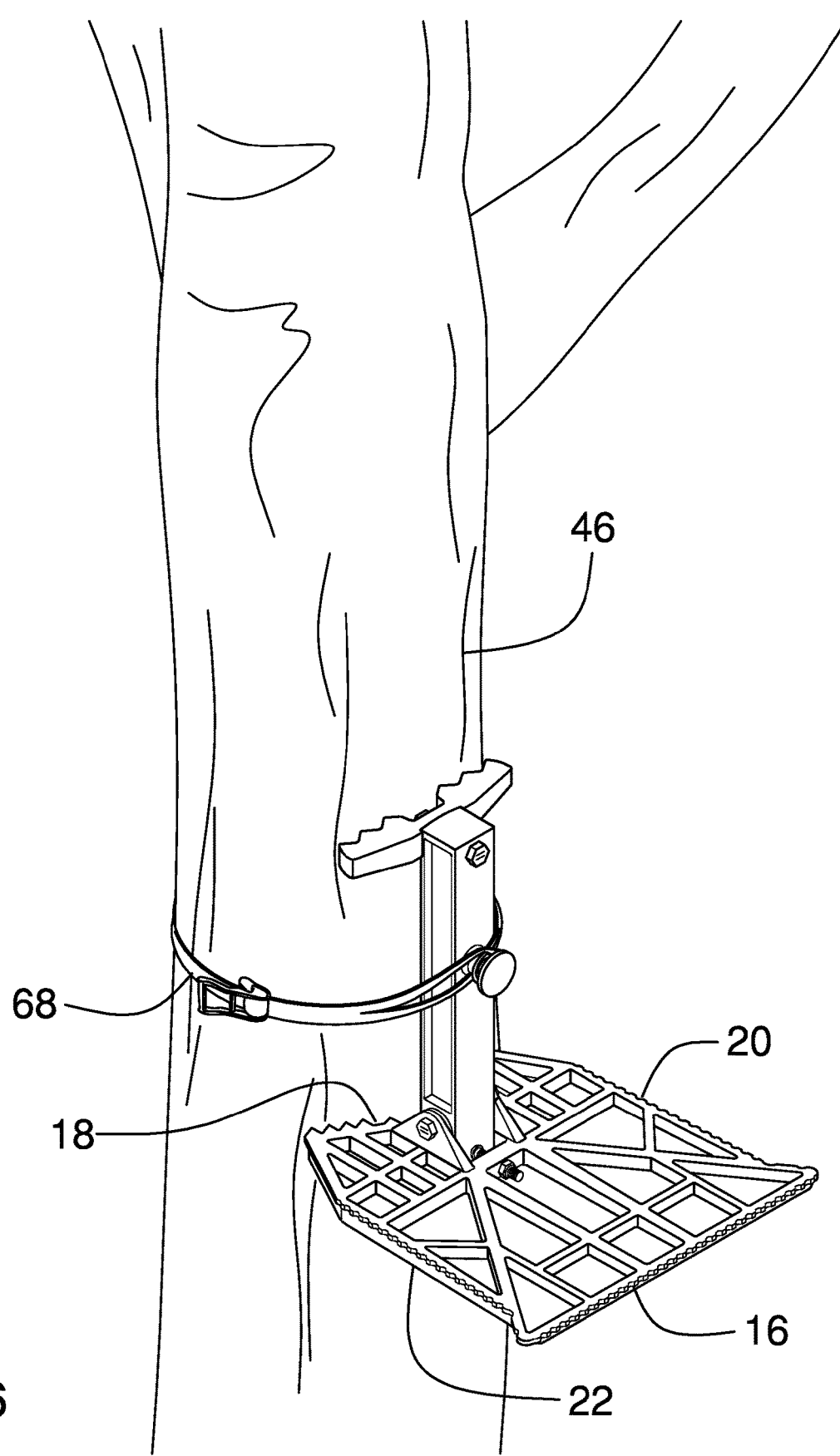
FIG. 6 is a rear, in-use isometric view of an embodiment of the disclosure.

The front edge 18 includes a receiving notch 52 therein that is spaced from the first 20 and second 22 lateral edges. As shown in FIG. 3, the front edge 18 has a shape to partially receive the trunk of a tree 46. The front edge 18 may include a first section 54 positioned between the first lateral edge 20 and the receiving notch 52 and a second section 56 positioned between the second lateral edge 22 and the receiving notch 52, wherein the first 54 and second 56 sections are angled inwardly from a respective one of the first 20 and second 22 lateral edges toward the receiving notch 52. This forms V-shaped depression, leading to the notch 52, and which can engage the tree 46 as shown in FIG. 6. Angles 57 formed on the outer surface 30 by the intersection of the first lateral edge 20 and first section 54 and the intersection of the second lateral edge 22 and second section 22 are greater than 200° and may be as great as 330°.

A post 58 is attached to the platform 12 adjacent to the front edge 18. The post 58 extends upwardly from the platform 12. A cleat 60 is attached to the post 58 adjacent to an upper end 62 of the post 58 and is positioned on a front side 64 of the post 58. The cleat 60 is configured to engage a surface of the tree 46. The post 58 is pivotally coupled to the panel 12 and extends into the notch when the post 58 is in a vertical orientation extending upwardly from the platform 12. A hold 66 is attached to the post 58. The hold 66 may be knobbed shaped and is configured to engage a strap 68 extendable around the tree 46 and forming an attachment point for the strap 68 on the post 58. The hold 66 is positioned on a rear side 70 of the post 58. The notch 52, post 58, hold 66 and strap 68 are part of a conventional mounting system used for mounting the platform 12 to the tree 46. However, different, conventional mounts may be used with the platform 12 to perform the same function. Thus, the platform 12 may be attached to any mount removably attached to a tree 46 such that some configurations will not require the front edge 18 to be configured to engage the tree 46.

In use, the platform 12 is mounted in a tree 46 as shown in FIG. 6 and as described above. A hunter will stand on the platform 12, typically while wearing a harness, and use the platform 12 to allow for adjustment of their body position relative to the tree 46. The harness will typically extend from below the buttocks to the lower back so that the hunter is "sitting" in the harness and is able to swing/rotate their body relative to the tree 46 to allow for getting a shot off in any direction. When bow hunting, a hunter will require a larger area of space in front and behind them movements required while aiming. For example, when shooting behind their location, i.e. in the direction extending outwardly and rearwardly away from the rearward edge 16, will rotate to face away from the tree 46 and move laterally to the tree 46 depending on the direction they want to execute a shot and somewhat on whether they are right or left handed. While rotating and preparing to release their arrow, the platform 12 is used for stabilization purposes. The toe receiver 38 ensures that the hunter's foot will not slide along and off of the first 20 or second 22 lateral edges and provides an indentation "stop" or toe kick to achieve a greater amount of leverage as the hunter pushes back from the platform 12 while their shoulder is positioned lateral to and possibly abutting the tree 46. Without the toe receiver 38 the hunter is more limited in how far laterally they may position their body and still maintain the stability required to effectively use a bow. The gripping protuberances 50 on the first lateral 20, second lateral 22, and rear 16 edges enhance the grip between the user's foot (i.e. generally their footwear) and the platform 12. The gripping protuberances 50 on the first 20 and second 22 lateral edges prevent the footwear from sliding forwardly or rearwardly along the first 20 and second 22 lateral edges, respectively, and enhance the traction of the toe receivers 38. The gripping protuberances 50 on the rear edge 16, in particular, prevent the footwear from sliding laterally along the rear edge 16 when the user's feet are driving into the rear edge 16 as they lean backwardly and laterally away from the tree 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A support assembly for standing on by a person hunting from a tree, the support assembly being configured to be removably securable to the tree, the support assembly including:
    a platform having a perimeter edge, the perimeter edge including a front edge, a rear edge, a first lateral edge and a second lateral edge, the platform having a top surface, a bottom surface and an outer surface positioned between the top and bottom surfaces, the front edge being configured to engage the tree;
    the first and second lateral edges each including:
        a front section abutting the front edge;
        a rear section abutting the rear edge, the rear section including a toe receiver, the toe receiver being formed by a bend in the outer surface of the rear section, the toe receiver being positioned nearer to the rear edge than the front edge, the bend forming an angle on the outer surface being less than 160° and at least equal to or greater than 90°; and
    a plurality of rear gripping protuberances being attached to and extending outwardly from the outer surface of the rear edge, wherein the rear gripping protuberances are configured to be engaged by a user for stability when the user rotates relative to the platform.

2. The support assembly according to claim 1, further including a plurality of lateral gripping protuberances extending outwardly from the outer surfaces of the first and second lateral edges, the lateral gripping protuberances being dispersed along the first and second lateral edges adjacent to the rear edge and on opposite sides of the bends in associated ones of the toe receivers.

3. The support assembly according to claim 1, wherein the rear gripping protuberances extend vertically no higher than a plane of the top surface.

4. The support assembly according to claim 2, wherein the lateral gripping protuberances extend vertically no higher than a plane of the top surface.

5. The support assembly according to claim 1, wherein the first and second lateral edges each comprises a unitary structure from the front edge to the rear edge.

6. The support assembly according to claim 5, wherein the rear gripping protuberances extend vertically no higher than a plane of the top surface.

7. The support assembly according to claim 6, further including a plurality of lateral gripping protuberances extending outwardly from the outer surfaces of the first and second lateral edges, the lateral gripping protuberances being dispersed along the first and second lateral edges adjacent to the rear edge and on opposite sides of the bends in associated ones of the toe receivers.

8. The support assembly according to claim 5, wherein the first and second lateral edges each includes:
    the bend being a first bend of a pair of bends in the outer surface, a second bend of the pair of bends being positioned nearer to the front edge than the rear edge and forming the angle in the outer surface being between 190° and 250°.

9. The support assembly according to claim 8, wherein:
    the front edge having a notch therein and dividing the front edge into a first section and a second section, the notch being configured to receive a post;
    the first section being angled rearwardly toward the notch from a juncture of the first section and the first lateral edge, the second section being angled rearwardly toward the notch from a juncture of the second section and the second lateral edge; and the junctures first and second lateral edges and an associated one of the first and second sections forming an angle on the outer surface being greater than 200°.

10. The support assembly according to claim 9, wherein the first lateral edge, the second lateral edge, the rear edge, and the front edge are together comprised of a unitary structure.

11. The support assembly according to claim 10, further including a plurality of lateral gripping protuberances extending outwardly from the outer surfaces of the first and second lateral edges, the lateral gripping protuberances being dispersed along the first and second lateral edges adjacent to the rear edge and on opposite sides of the bends in associated ones of the toe receivers.

12. The support assembly according to claim 11, wherein the lateral gripping protuberances extend vertically no higher than a plane of the top surface.

13. The support assembly according to claim 11, further including the post being attached to the platform adjacent to the front edge, the post extending upwardly from the platform, a cleat being attached to the post adjacent to an upper end of the post, the cleat being positioned on a front side of the post and being configured to engage a surface of the tree, the post being pivotally coupled to the platform and extending into the notch when the post is in a vertical orientation extending upwardly from the platform.

14. The support assembly according to claim 9, further including the post being attached to the platform adjacent to the front edge, the post extending upwardly from the platform, a cleat being attached to the post adjacent to an upper end of the post, the cleat being positioned on a front side of the post and being configured to engage a surface of the tree, the post being pivotally coupled to the platform and extending into the notch when the post is in a vertical orientation extending upwardly from the platform.

15. The support assembly according to claim 14, further including a plurality of lateral gripping protuberances extending outwardly from the outer surfaces of the first and second lateral edges, the lateral gripping protuberances being dispersed along the first and second lateral edges adjacent to the rear edge and on opposite sides of the bends in associated ones of the toe receivers.

16. The support assembly according to claim 14, wherein the lateral gripping protuberances extend vertically no higher than a plane of the top surface.

17. A support assembly to physically support a person hunting from a tree, the support assembly being configured to be removably securable to the tree, the support assembly including:

a platform having a perimeter edge, the perimeter edge including a front edge, a rear edge, a first lateral edge and a second lateral edge, the platform having a top surface, a bottom surface and an outer surface positioned between the top and bottom surfaces, the front edge being configured to engage the tree; and a plurality of rear gripping protuberances being attached to and extending outwardly from the outer surface of the rear edge, wherein the rear gripping protuberances are configured to be engaged by a user for stability when the user rotates relative to the platform, wherein the rear gripping protuberances extend vertically no higher than a plane of the top surface.

18. The support assembly according to claim 17, wherein a plurality of lateral gripping protuberances are positioned on each of the first and second lateral edges.

19. The support assembly according to claim 17, further including:

the front edge has a notch therein and dividing the front edge into a first section and a second section, the notch being configured to receive a post;

the first section being angled rearwardly toward the notch from a juncture of the first section and the first lateral edge, the second section being angled rearwardly toward the notch from a juncture of the second section and the second lateral edge; and a post being attached to the platform adjacent to the front edge, the post extending upwardly from the platform, a cleat being attached to the post adjacent to an upper end of the post, the cleat being positioned on a front side of the post and being configured to engage a surface of the tree, the post being pivotally coupled to the platform and extending into the notch when the post is in a vertical orientation extending upwardly from the platform.

20. The support assembly according to claim 19, wherein:

the first and second lateral edges each includes:

a front section abutting the front edge;

a rear section abutting the rear edge, the rear section including a toe receiver, the toe receiver being formed by a bend in the outer surface of the rear section, the toe receiver being positioned nearer to the rear edge than the front edge and forming an indentation for receiving a user's foot.

* * * * *